United States Patent [19]

Ito et al.

[11] Patent Number: 4,774,662

[45] Date of Patent: Sep. 27, 1988

[54] METHOD FOR MANAGERIAL CLERK INSPECTION

[75] Inventors: Kazuichi Ito, Kasugai; Yoriko Uchida, Owariasahi, both of Japan

[73] Assignee: Hitachi, Ltd., Tokyo, Japan

[21] Appl. No.: 842,195

[22] Filed: Mar. 21, 1986

[30] Foreign Application Priority Data

Mar. 22, 1985 [JP] Japan ................................. 60-55891

[51] Int. Cl.⁴ ............................................ G06F 15/22
[52] U.S. Cl. .................................... 364/401; 235/379; 235/380; 340/825.31
[58] Field of Search ....................... 364/401, 404, 405; 235/379, 380; 340/825.31

[56] References Cited

U.S. PATENT DOCUMENTS

| | | | |
|---|---|---|---|
| 4,091,448 | 5/1978 | Clausing | 235/379 |
| 4,485,300 | 11/1984 | Peirce | 235/380 |

FOREIGN PATENT DOCUMENTS 58-165717 9/1983 Japan .

*Primary Examiner*—David L. Trafton
*Attorney, Agent, or Firm*—Antonelli, Terry & Wands

[57] ABSTRACT

A method for managerial clerk inspection in an on-line system comprising a plurality of regular clerk terminal units operated for transactions by regular clerks, a terminal unit dedicated to a managerial clerk and operated by the managerial clerk for acknowledgement of transactions, a central unit and a terminal control unit interposed between the central unit and the regular clerk terminal units as well as the managerial clerk terminal unit. When the regular clerk operates the regular clerk terminal unit, a transaction message is transmitted from the regular clerk terminal unit to the central unit, and the central unit decides whether the transaction requires acknowledgement by the managerial clerk. When the acknowledgement is required, the central unit transmits information indicative of the required acknowledgement to the regular clerk terminal unit via the terminal control unit and makes the regular clerk terminal unit display an indication of the required acknowledgement while temporarily releasing the regular clerk terminal unit from the transaction in question. The terminal control unit then informs the managerial clerk terminal unit of the occurrence of the transaction requiring the acknowledgement. When the managerial clerk operates the managerial clerk terminal unit to approve the transaction and information indicative of the managerial clerk approval is sent from the managerial clerk terminal unit to the regular clerk terminal unit, the terminal control unit informs the regular clerk terminal unit of the confirmed transaction.

3 Claims, 6 Drawing Sheets

FIG. 5(a)

```
┌─────────────────────────────┐
│  ┌─────┐                    │
│  │1234 │~61                 │
│  └─────┘                    │
│                             │
│  BRANCH NUMBER  (×××)       │
│  ACCOUNT NUMBER (××××××××)  │
│  BALANCE      ¥(  ××,×××,×××)│
│  PAYMENT         ¥(×,×××,×××)│
│                             │
└─────────────────────────────┘
         60
```

FIG. 5(b)

```
  63        62
┌──────────────────────────────────────────┐
│ *                                        │
│ SERIAL NUMBER                            │
│ SELECTION  [   ]  UNAPPROVED [    ]      │
│ SERIAL        ACCOUNT NUMBER             │
│ NUMBER GUIDE NAME (CUSTOMER) DA TIME REGION│
│ nnn   gggg   ×××  99999999  mm tttt  D   │
│  )     )     )      )        )   )   )   │
│ nnn   gggg   ×××  99999999  mm tttt  D   │
│ UNACKNOWLEDGED yyy CASES  APPROVED yyy CASES│
│ UNAPPROVED yyy CASES  FINISHED         │
│                       TRANSACTIONS yyy CASES│
└──────────────────────────────────────────┘
```

FIG. 5(c)

```
  65      64
┌──────────────────────────────────────────┐
│ *                                        │
│ SERIAL NUMBER                            │
│ SELECTION  [   ]                         │
│ SERIAL      ACCOUNT NUMBER               │
│ NUMBER GUIDE NAME (CUSTOMER)  TIME REGION│
│ nnn   ggg   ×××  99999999    tttt  D     │
│  )     )     )      )         )    )     │
│ nnn   gggg  ×××  99999999    tttt  D     │
│ UNACKNOWLEDGED yyy CASES  APPROVED yyy CASES│
│ UNAPPROVED yyy CASES  FINISHED         │
│                       TRANSACTIONS yyy CASES│
└──────────────────────────────────────────┘
```

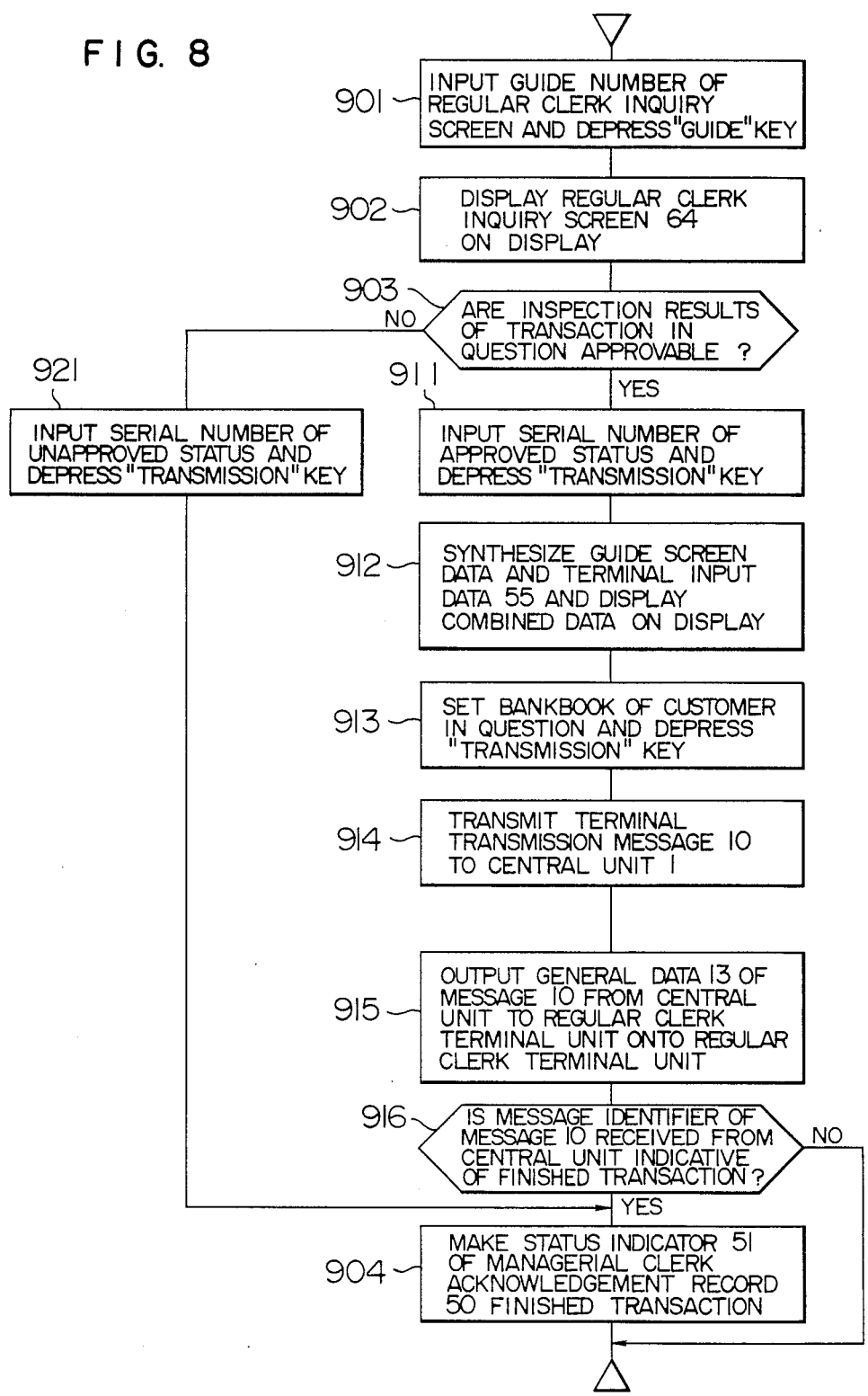

METHOD FOR MANAGERIAL CLERK INSPECTION

BACKGROUND OF THE INVENTION

1. Field of the Invention

This invention relates to a method for managerial clerk inspection in an on-line system adapted to inspect transactions which require acknowledgement by a managerial clerk.

2. Description of the Related Art

Conventinally, in an on-line banking system, for example, there is generally available a method of obtaining acknowledgement by a managerial clerk. According to the method, the managerial clerk goes to a terminal unit which is ready for execution of a high amount of payment transaction requiring managerial clerk acknowledgement and inputs a managerial clerk identification data such as a managerial clerk key and a managerial clerk card into the terminal unit, whereby data added with managerial clerk anthorization data is transmitted from the terminal unit to a central unit. This method is however disadvantageous in that each time a transaction requiring the managerial clerk acknowledgement occurs, the managerial clerk must go to the terminal unit in question.

An apparatus for solving this problem has been proposed in Japanese Patent Unexamined Publication No. 58-165171. The apparatus comprises a managerial clerk acknowledgement controller which operatively responds to an acknowledgement request from each of a plurality of regular clerk terminal units so as to couple a regular clerk terminal unit issuing the acknowledgement request to the managerial clerk acknowledgement controller, thereby permitting a managerial clerk to acknowledge a transaction. In this apparatus, however, the managerial clerk acknowledgement controller is occupied by a single regular clerk terminal unit requesting acknowledgement during an acknowledgement operation and another regular clerk terminal unit which faces a transaction requiring acknowledgement is forced into retardation until the managerial clerk acknowledgement controller becomes idle, causing congestion of transaction processing. Further, the managerial clerk will hardly deal with other sevices than the acknowledgement procedure. Moreover, this conventional apparatus requires the managerial clerk acknowledgement controller which differs in construction from the regular clerk terminal unit.

SUMMARY OF THE INVENTION

An object of this invention is to provide a method for managerial clerk inspection which can permit a managerial clerk to know contents of a transaction requiring managerial clerk acknowledgement and to acknowledge the contents by means of a terminal unit dedicated to the managerial clerk and which can permit an operator of a regular clerk terminal unit to deal with another transaction procedure independent of a managerial clerk acknowledgement procedure after issuance of a request for acknowledgement of the transaction.

Another object of this invention is to provide a method for managerial clerk inspection which permits the managerial clerk terminal unit to have a construction similar to that of the regular clerk terminal unit.

According to this invention, a method for managerial clerk inspection is directed to an on-line system comprising a plurality of regular clerk terminal units operated for transactions by operators, a terminal unit dedicated to a managerial clerk and operated by the managerial clerk for acknowledgement of transactions, a central unit and a terminal control unit interposed between the central unit and the regular clerk terminal units as well as the managerial clerk terminal unit, and in this method, when the operator operates the regular clerk terminal unit, a transaction request message is transmitted from the regular clerk terminal unit to the central unit, and the central unit decides whether the transaction requires acknowledgement by the managerial clerk. When the acknowledgement is required, the central unit transmits a message indicative of the required acknowledgement to the regular clerk terminal unit via the terminal control unit and makes the regular clerk terminal unit display an indication of the required acknowledgement while temporarily releasing the regular clerk terminal unit from the transaction in question. This permits the regular clerk terminal unit to execute another transaction operation. The terminal control unit receives the message indicative of the required managerial clerk acknowledgement from the central unit so as to store information regarding the transaction and transmits the message indicative of the required managerial clerk acknowledgement to the managerial clerk terminal unit so as to make the managerial clerk terminal unit display an indication of the required acknowledgement. The terminal control unit responds to a request from the managerial clerk terminal unit operated by the managerial clerk so as to send, from the terminal control unit to the managerial clerk terminal unit, contents of the transaction requiring acknowledgement, thereby making the managerial clerk terminal unit display the contents. When the managerial clerk operates the managerial clerk terminal unit to approve the transaction, a message indicative of approval is transmitted from the managerial clerk terminal unit to the terminal control unit. The terminal control unit stores the message indicative of the approval of the transaction and sends to the regular clerk terminal unit a message indicative of finished transaction inspection so as to make the regular clerk terminal unit display an indication of finished inspection. The terminal control unit responds to a request from the regular clerk terminal unit operated by the operator so as to transmit from the terminal control unit to the regular clerk terminal unit a message indicative of the contents of the approved transaction, thereby making the regular clerk terminal unit display an indication of the contents. The terminal control unit then responds to a request from the regular clerk terminal unit operated for transaction by the operator so as to transmit from the terminal control unit to the central unit a message requesting processing of the approved transaction. When the managerial clerk operates the managerial clerk terminal unit to reject the transaction, the terminal control unit responds to a message indicative of rejection from the managerial clerk terminal unit so as to store the unapproved transaction and informs the regular clerk terminal unit of the unapproved transaction in a manner similar to the approved transaction.

In this invention, it is not necessary for each operator to decide whether a transaction requires acknowledgement but such a decision is made by a program in the central unit. When a transaction requested by a regular clerk terminal unit requires managerial clerk acknowledgement, the regular clerk terminal unit responsive to a message from the central unit informs the operator of the fact that the transaction requires acknowledgement and the operator can deal with another transaction operation independent of an acknolwledgement operation by the managerial clerk. The request for managerial clerk acknowledgement of a transaction from each regular clerk terminal unit is processed independently of the acknowledgement procedure by the managerial clerk and the managerial clerk terminal unit will not be occupied by a single regular clerk terminal unit for the sake of obtaining managerial clerk acknowledgement, thereby making it possible to deal with transactions at high speeds.

The managerial clerk terminal unit responsive to a message from the terminal control unit informs the managerial clerk of the occurrence of the transaction requiring acknowledgement, and the managerial clerk can be informed of the contents of the transaction by operating the managerial clerk terminal unit in order to approve or reject the transaction. Therefore, for acknowledgement of transactions, the managerial clerk need not go to the regular clerk terminal unit.

The managerial clerk terminal unit and the regular clerk terminal units are coupled to the terminal control unit. Information regarding transactions requiring acknowledgement is stored in the terminal control unit and transmitted in accordance with a request from each of the managerial clerk terminal unit and regular clerk terminal unit. Thus, the managerial clerk terminal unit may have the same construction at the regular clerk terminal unit with the only exception being that a bankbook printer and a bankbook magnetic stripe reader/writer which are used for transactions and are included in the regular clerk terminal unit are eliminated. Since it is not necessary to provide a special device for the managerial clerk, reduction of cost can be made.

BRIEF DESCRIPTION OF THE DRAWINGS

These and other objects and advantages of the persent invention will become apparent by reference to the following description and accompanying drawings wherein:

FIGS. 5(a), 5(b) and 5(c) show examples of display formats of a transaction screen and inquiry screens respectively displayed on the regular clerk terminal unit and the managerial clerk terminal unit;

FIG. 8 is a flow chart for explaining transaction confirmation processings by the regular clerk terminal unit.

DESCRIPTION OF THE PREFERRED EMBODIMENT

Figure 1:
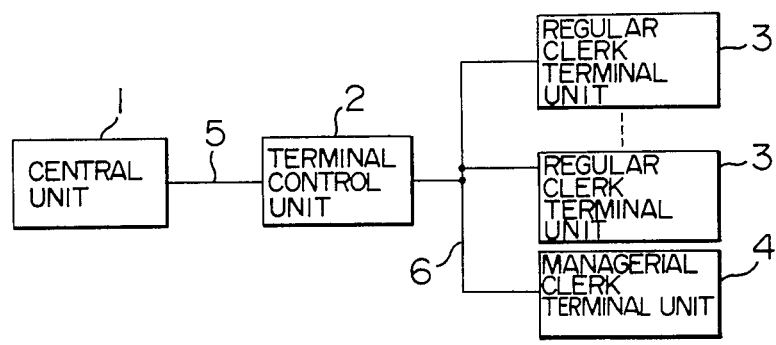
FIG. 1 is a block diagram showing an example of the construction of an on-line banking system, comprised of a central unit, a terminal control unit and terminal units, in an embodiment of the invention.

FIG. 1 is a block diagram showing an example of the construction of an on-line banking system in an embodiment of the invention which comprises a central unit, a terminal control unit and terminal units. As schematically shown in FIG. 1, the central unit 1 is coupled with the terminal control unit 2 through a communication channel 5 and the terminal control unit 2 is coupled with a plurality of terminal units 3 for regular clerks and a terminal unit 4 dedicated to a managerial clerk through communication channels 6.

Figure 2:
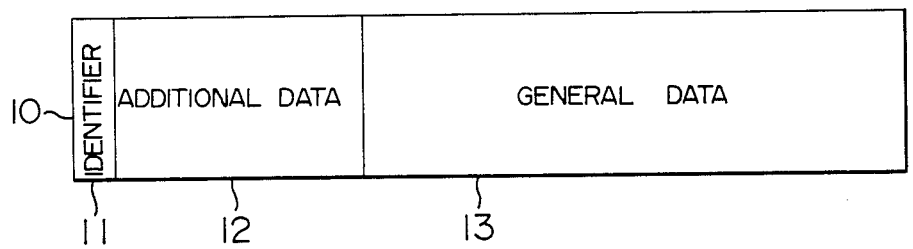
FIG. 2 shows an example of the format of a transmitting/receiving message.

FIG. 2 exemplifies a format of a transmitting/receiving message 10 to be communicated between the central unit 1 and the terminal control unit 2 and between the terminal control unit 2 and the terminal units 3 and 4. The format contains a message identifier code 11 indicative of a character or nature of a message in question, additional data 12 used only in a message to be communicated between the control unit 1 and the terminal control unit 2 in order to store a transaction time and information inherent to customers into the terminal control unit 2, and general data 13.

Figure 3:
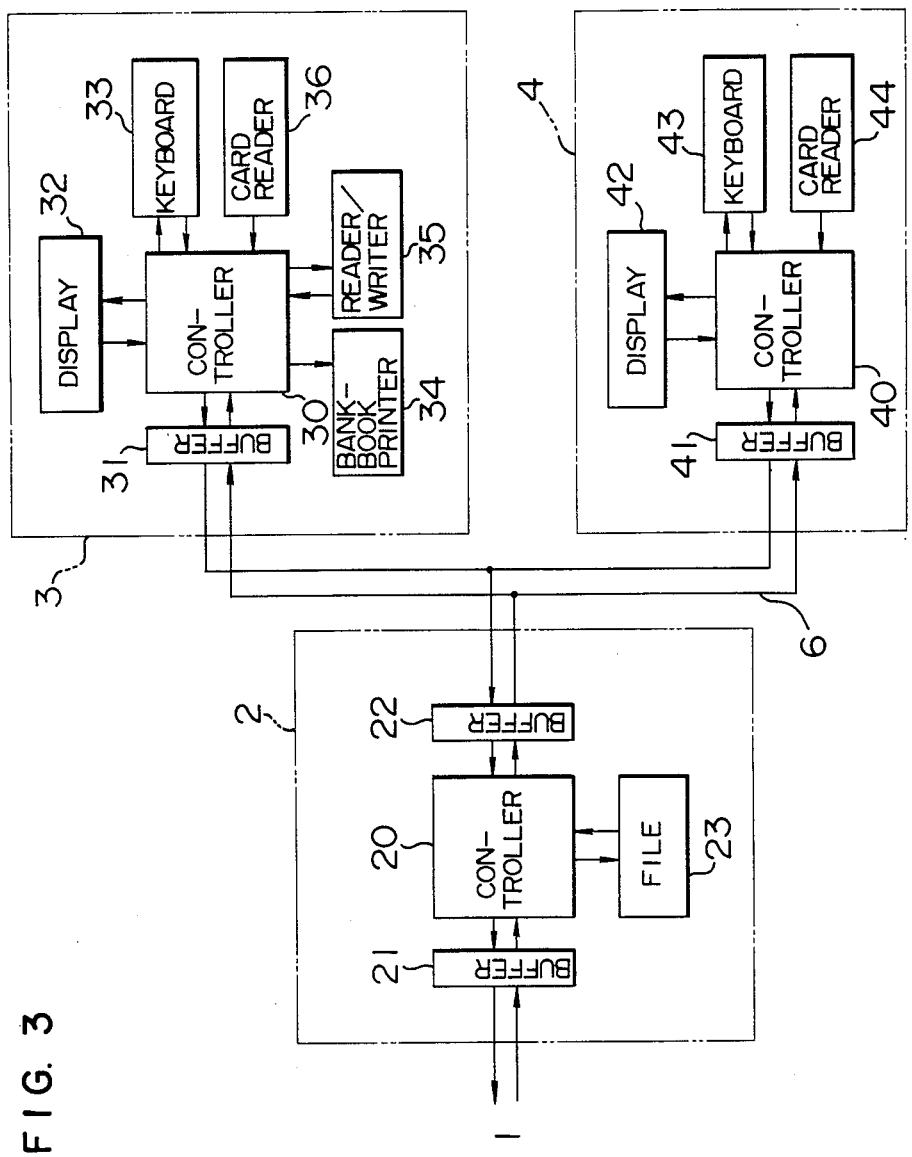
FIG. 3 is a block diagram showing details of the terminal control unit and terminal units.

Details of the terminal control unit 2 and terminal units 3 and 4 are illustrated, in block form, in FIG. 3. The terminal control unit 2 comprises a controller 20, a transmitting/receiving buffer 21 adapted to the central unit 1, an input/output buffer 22 adapted to the terminal units 3 and 4, and a file device 23. For simplicity of illustration, only one regular clerk terminal unit 3 is depicted in FIG. 3. The regular clerk terminal unit 3 comprises a controller 30, an input/output buffer 31 adapted to the terminal controller 2, a display 32, a keyboard 33, a bankbook printer 34, a reader/writer 35 for read/write of magnetic stripes of a bankbook, and an operator card reader 36.

The managerial clerk terminal unit 4 has a similar construction to that of the regular clerk terminal unit 3 with the only exception being that the bankbook printer and magnetic stripe reader/writer are eliminated, including a controller 40, an input/output buffer 41 adapted to the terminal controller 2, a display 42, a keyboard 43 and a managerial clerk card reader 44.

Figure 4:
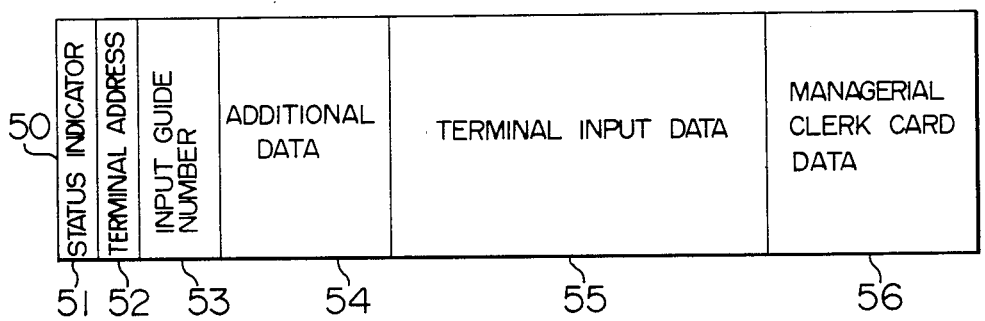
FIG. 4 shows an example of the format of a managerial clerk acknowledgement file record used for communication of data between a regular clerk terminal unit and a terminal unit dedicated to a managerial clerk.

FIG. 4 exemplifies a format of a managerial clerk acknowledgement file record 50 to be stored in the file device 23. This format contains a status indicator 51 indicative of a confirmed status of a managerial clerk acknowledgement file record 50 in question, a terminal address 52 of a terminal unit in which the managerial clerk acknowledgement record 50 in question is registered, a guide number of a transaction screen when the managerial clerk acknowledgement record 50 of interest is registered, an additional data 54 corresponding to the additional data 12 received in the form of the transmitting/receiving message 10 from the central unit 1, a terminal input data 55 of the transaction screen when the managerial clerk acknowledgement record 50 of interest is registered, and a managerial clerk card data 56 read out of the managerial clerk terminal unit 4.

FIGS. 5(a), 5(b) and 5(c) exemplify a transaction screen and inquiry screens. On a transaction screen 60, a data read out of the magnetic stripe reader/writer 35 of the regular clerk terminal unit 3 and a data inputted from the keyboard 33 are displayed in brackets [ ] to indicate a branch number, an account number, a balance and a payment, and a guide number 61 is displayed in a dotted block      . On a managerial clerk inquiry screen 62 of the managerial clerk terminal unit 4, a managerial clerk acknowledgement requesting mark 63 in the form of * is displayed. Displayed on a regular clerk inquiry screen 64 of the regular clerk terminal unit 3 is a managerial clerk confirmation mark 65 also in the form of *.

The system of the above construction operates as will be described below.

A transaction screen 50 for payment transactions, for example, is displayed on the display 32 of the regular clerk terminal unit 3, a branch number, an account number, a balance and a payment are inputted by means of the magnetic stripe reader 35 and keyboard 33 and indicated in the brackets, and a transmission key is depressed. Then, a terminal transmission message 10 edited by the controller 30 is transmitted to the central unit 1 via the input/output buffer 31 and terminal control unit 2. In the terminal control unit 2, the terminal transmission message 10 is temporarily shunted into the file device 23.

The central unit 1 examines whether the terminal transmission message 10 sent from the regular clerk terminal unit 3 contains a data requiring managerial clerk acknowledgement. For example, the central unit 1 checks an amount of the payment described in the general data 13 and decides that managerial clerk acknowledgement is necessary if the payment amount is high. Then, the central unit 1 prepares a response which is added with an additional data 12 indicative of a transaction time and information inherent to a customer in question and transmits an error response standing for a transmitting/receiving message 10 to the regular clerk terminal unit 3, so that a bankbook inherent to the customer which has been inserted in the bankbook printer 34 of the terminal unit 3 may be discharged from the bankbook printer 34. The thus discharged bankbook is temporarily held. The regular clerk terminal unit 3 is temporarily released from the transaction requiring managerial clerk acknowledgement and the operator is permitted to deal with another transaction during execution of inspection by the managerial clerk.

When the terminal control unit 2 receives the transmitting/receiving message 10 from the central unit 1 and recognizes that a managerial clerk acknowledgement request is designated in the message identifier 11 of the message 10, it sets in a managerial clerk acknowledgement file record 50 an unacknowledged status at the status indicator 51, a terminal address of the regular clerk terminal unit 3 of interest at the terminal address field 52, a guide number 61 of the transaction of interest at the input guide number field 53, the additional data 12 received from the central unit 1 at the additional data field 54, and the terminal input data temporarily shunted into the file device 23 at the terminal input data field 55. This managerial clerk acknowledgement file record 50 is registered into the file device 23.

The terminal control unit 2 also drives a buzzer of the managerial clerk terminal unit 4, indicating that the managerial clerk acknowledgement file record 50 requiring managerial clerk acknowledgement has been registered and causes the managerial clerk acknowledgement requesting mark 63 to be displayed on the display 42, thereby informing a managerial clerk at the managerial clerk terminal unit 4 of the fact. Since the managerial clerk acknowledgement requesting mark 63 is displayed at an area of display 42 dedicated thereto, indications excepting the mark remain intact during display of the mark.

When the buzzer of the managerial clerk terminal unit 4 alerts and the managerial clerk acknowledgement requesting mark 63 is displayed on the display 42, the managerial clerk keys in a guide number of a managerial clerk inquiry screen 62 by means of the keyboard 43 and depresses a guide key. As a result, the managerial clerk inquiry screen 62 is displayed on the display 42.

By making reference to an indication at a region D on managerial clerk inquiry screen 62 which reflects a status indicator 51 of each managerial clerk acknowledgement file record 50, the managerial clerk selects a serial number indicative of the unacknowledged transaction, keys in the selected serial number by means of the keyboard 43 so as to be indicated in a bracket entitled serial number selection, and depresses a transmission key. This causes the terminal control unit 2 to synthesize a guide screen data 55 of the input guide number 53 set in the managerial clerk acknowledgement file record 50 designated by the serial number, thus displaying an unacknowledged transaction screen 60 on the display 42 of the managerial clerk terminal unit 4.

Subsequently, the managerial clerk inspects the input data indicated in the brackets of the transaction screen 60. If the data is approvable, the operator card reader 44 is caused to read the managerial clerk card as a managerial identification data, and the managerial clerk depresses the transmission key to execute a managerial clerk approval operation.

When the managerial clerk card data is inputted from the managerial clerk terminal unit 4 of interest during display of the unacknowledged transaction screen 60 at the managerial clerk terminal unit 4, the terminal control unit 2 recognizes the approval by the managerial clerk, thus updating the contents of the file device 23 by changing the status indicator 51 of the managerial clerk acknowledgement file record 50 into an approved status and setting the managerial clerk card data 56 into the managerial clerk acknowledgement file record 50. The terminal control unit 2 also sends a message indicative of confirmed inspection to the regular clerk terminal unit 3 and drives a buzzer of the regular clerk terminal unit 3, indicating that managerial clerk confirmation of the transaction data, inputted from the regular clerk terminal unit 3 and requiring the managerial clerk acknowledgement, has been completed and causes the managerial clerk confirmation mark 65 to be displayed on the display 32, thereby informing the operater of the confirmation.

If the managerial clerk inspects the input data indicated in the brackets of the unacknowledged transaction screen 60 at the managerial clerk terminal unit 4 to reject the data, the managerial clerk again inputs the guide number of the managerial clerk inquiry screen by means of the keyboard 43 and depresses the guide key to display the managerial clerk inquiry screen 62. Under this condition, the managerial clerk inputs a serial number indicative of the unapproved transaction so that the serial number is indicated in the bracket entitled serial number selection and an unapproved identification code so that this code is indicated in a bracket entitled unapproved, and carries out a managerial clerk unapproved operation.

When the managerial clerk inputs the unapproved identification code during display of the managerial clerk inquiry screen 62, the terminal control unit 2 updates the contents of the file device 23 by changing the status indicator 51 of the managerial clerk acknowledgement file record 50 designated by the serial number selection into an unapproved status and as in the managerial clerk approval operation, drives the buzzer of the regular clerk terminal device 3, causing the managerial clerk confirmation mark 65 to be displayed on the display 32.

When the buzzer of the regular clerk terminal unit 3 is driven and the managerial clerk confirmation mark 65 is displayed on the display 32, the operator of the regular clerk terminal unit 3 inputs the guide number of the regular clerk inquiry screen by means of the keyboard 33 and depresses the guide key, causing the regular clerk inquiry screen 64 to be displayed on the display 33. By making reference to an indication at a region D on regular clerk inquiry screen 64 which reflects a status indicator 51 of each managerial clerk acknowledgement file record 50, the operator selects a confirmed serial number, keys in the selected serial number by means of the keyboard 33 so that the serial number is indicated in a bracket entitled serial number selection, and depresses a transmission key. This causes the terminal control unit 2 to synthesize guide screen data of the input guide number 53 and terminal data 55 which is set in the managerial clerk acknowledgement file record 50 designated by the serial number, thus displaying a confirmed transaction screen 60 on the display 32.

Subsequently, the operator of the regular clerk terminal unit 3 in question makes reference to the transaction screen 60 displayed on the display 32 and again sets the held bankbook of the customer in the bankbook printer 34 and depresses the transmission key.

The terminal control unit 2 adds to the terminal input data inputted during display of the confirmed transaction screen 60 the managerial clerk card data 56 set in the managerial clerk acknowledgement file record 50, and the thus combined data is sent as a transmission message 10 to the central unit 1.

The central unit 1 utilizes the transmission message 10 and executes a predetermined processing to return a response message to the terminal control unit 2.

The terminal control unit 2 receives the response message sent from the central unit 1 and transmits the received message 10, now used for updating the bankbook, to the regular clerk terminal unit 3, at which the bankbook is printed. At the same time, the contents of the magnetic stripe is updated and the bankbook is discharged from the bankbook printer 34, thus completing the payment transaction requiring the managerial clerk acknowledgement.

When the operator of the regular clerk terminal unit 3 selects an unapproved managerial clerk acknowledgement file record 50 through the managerial clerk unapproved operation by making reference to an indication in the region D on regular clerk inquiry screen 64 which reflects a status indicator 51 of the record in question, the operator inputs an unapproved serial number by means of the keyboard 33 so that the serial number is indicated in the bracket entitled serial number selection and depresses the transmission key. This causes the terminal control unit 2 to receive a transmission message 10 sent from the regular clerk terminal unit 3 and to synthesize a guide screen data of the input guide number 53 and a terminal input data 55 which are set in the managerial clerk acknowledgement file record 50 designated by the serial number, thus displaying an unapproved transaction screen 60 on the display 32. When under this condition the operator depresses the transmission key, the status indicator 51 of the managerial clerk acknowledgement file record is changed to a transaction finished status thereby updating the contents of the file device 23, thus completing the managerial clerk unapproved payment transaction.

The terminal control unit operates according to the following description with reference to the flow charts.

The present invention is based on program control consisting of three operations. A first operation is for registering data requiring managerial clerk acknowledgement into the managerial clerk acknowledgement file 23 by means of the regular clerk terminal unit 3, a second operation is the managerial clerk acknowledgement operation by means of the managerial clerk terminal unit 4, and a third operation is the confirmed transaction operation by means of the regular clerk terminal unit 3.

Figure 6A:
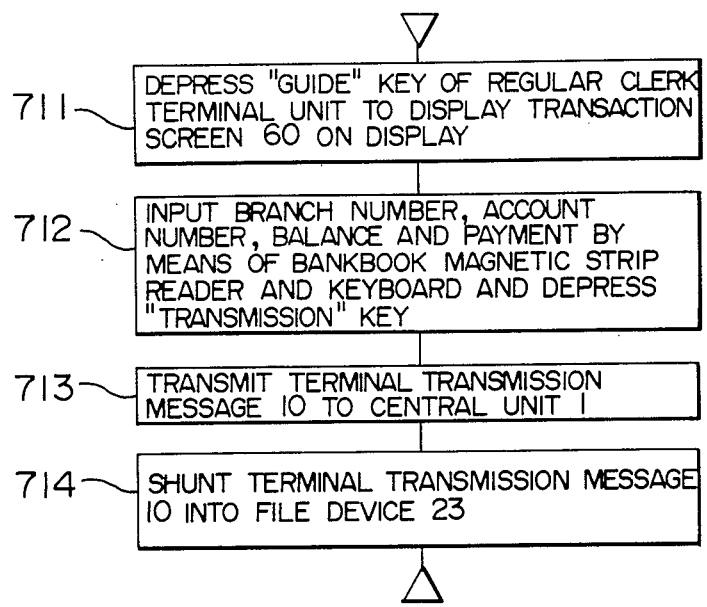
FIGS. 6(a) and 6(b) illustrate, respectively, a flow chart useful in explaining processings for transmission of a transaction request message from the regular clerk terminal unit to the central unit and a flow chart useful in explaining processings when the central unit responds to the regular clerk terminal unit.

The above operations are controlled in accordance with the flow charts shown in FIGS. 6(a) and 6(b), 7 and 8. Transmission from the regular clerk terminal unit 3 to the central unit 1 is carried out as shown at FIG. 6(a).

In a step 711, the operator of the regular clerk terminal unit 3 depresses the guide key after a guide number of payment transaction, for example, is inputted, thereby displaying a transaction screen 60. In a step 712, necessary data is inputted so as to be indicated in the brackets of the transaction screen 60 and the transmission key is depressed. Then, in a step 713, a transmission message 10 is first transmitted from the regular clerk terminal unit 3 to the terminal control unit 2 and thereafter to the central unit 1. In a step 714, the terminal control unit 2 temporarily shunts the terminal transmission message 10.

Figure 6B:
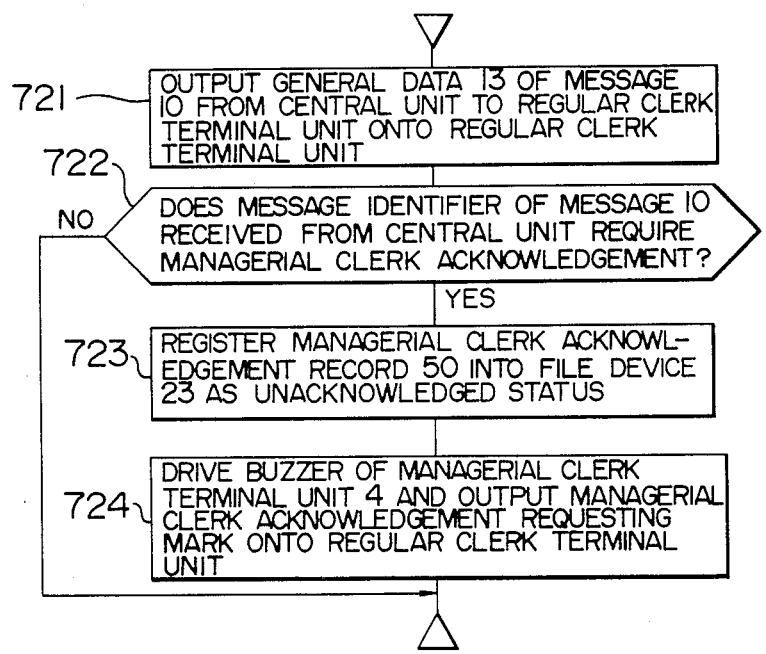

The central unit 1 responds to the regular clerk terminal unit 3 as shown at FIG. 6(b). In a step 721, the central unit 1 checks the transmission message 10 from the regular clerk terminal unit 3, determines general data 13 in the form of either an error response when managerial clerk acknowledgement is necessary or an ordinary response when no managerial clerk acknowledgement is necessary, and adds the general data to a message 10 directed to the regular clerk terminal unit, thus transmitting the combined data message 10 to the regular clerk terminal unit 3. In a step 722, a message identifier 11 in the message 10 directed to the regular clerk terminal unit is decided. If a data requiring managerial clerk acknowledgement is designated, a managerial clerk acknowledgement file record 50 is registered in the file device 23 of the terminal control unit 2 in a step 723 and, in a step 724, the buzzer of the managerial clerk terminal unit 4 is driven and the managerial clerk acknowledgement requesting mark is displayed, thereby informing a managerial clerk of the file registration.

Figure 7:
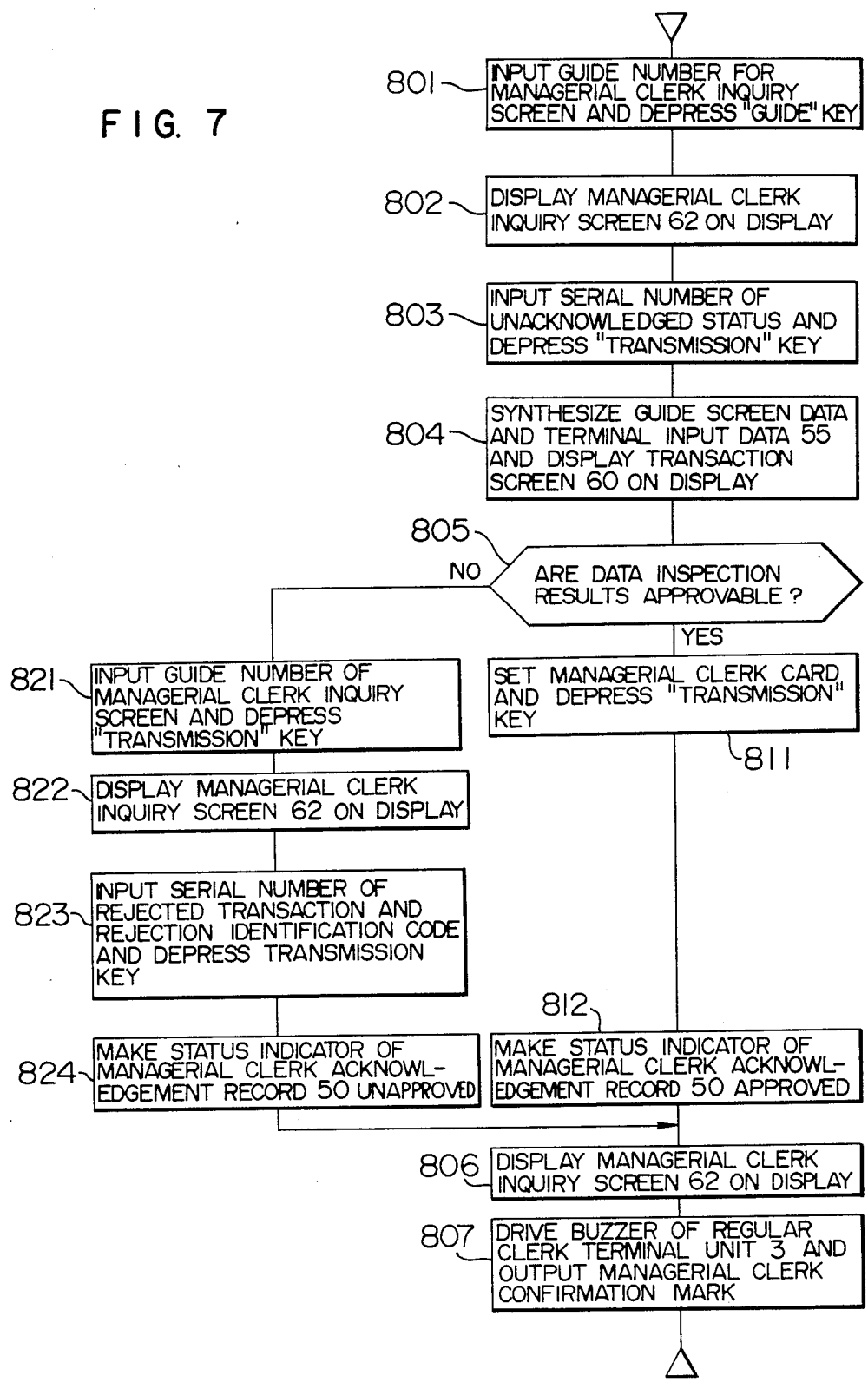
FIG. 7 is a flow chart for explaining managerial clerk acknowledqement processings by the managerial clerk terminal unit.

The managerial clerk terminal unit 4 processes the managerial clerk acknowledgement in accordance with a flow chart as shown in FIG. 7.

In a step 801, the managerial clerk informed by the buzzer alert and the managerial clerk acknowledgement requesting mark keys in a guide number of a managerial clerk inquiry screen by means of the keyboard 43 of the managerial clerk terminal unit 4 and depresses the guide key. Then, in a step 802, the terminal control unit 2 causes the managerial clerk inquiry screen 62 to be displayed on the display 42 of the managerial clerk terminal unit 4. Thereafter, in a step 803, the managerial clerk selects a serial number indicative of unacknowledged transaction from the managerial clerk inquiry screen 62, inputs the selected serial number by means of the keyboard 43 so that the serial number is indicated in the bracket entitled serial number selection and depresses the transmission key. Consequently, in a step 804, the terminal control unit 2 synthesizes a guide screen data and a terminal input data 55 set in the managerial clerk acknowledgement file record 50, causing the combined data to be displayed on the display 42 of the managerial clerk terminal unit 4.

In a step 805, results of inspection for the terminal input data 55 by the managerial clerk are decided. If approvable, in a step 811, the managerial clerk sets a managerial clerk card and depresses the transmission key. Consequently, in a step 812, the terminal control unit 2 renders the status indicator of the managerial clerk acknowledgement record 50 approved. If unapproved, in a step 821, the managerial clerk again inputs, the guide number of the managerial clerk inquiry screen and thereafter depresses the transmission key. Then, in a step 822, the terminal control unit 2 causes the managerial clerk inquiry screen 62 to be displayed on the display 42. Subsequently, in a step 823, the managerial clerk inputs a serial number of the unapproved transaction and an unapproved identification code by means of the keyboard 43, and depresses the transmission key. Consequently, in a step 824, the terminal control unit 2 renders the status indicator 51 of the managerial clerk acknowledgement file record 50 unapproved. Thereafter, in a step 806, the terminal control unit 2 again causes the managerial clerk terminal unit 4 to display the managerial clerk inquiry screen 62, permitting the managerial clerk to continue inspection and, in a step 807, causes the regular clerk terminal unit 3 to drive the buzzer and to display the managerial confirmation mark, thereby informing the operator of the regular clerk terminal unit 3 of the presence of a transaction which has been inspected by the managerial clerk.

The regular clerk terminal unit 3 processes confirmed transactions in accordance with a flow chart shown in FIG. 8.

In order to retrieve transactions inspected by the managerial clerk, the operator of regular clerk terminal unit 3 calls a regular clerk inquiry screen 64 by inputting a guide number and depressing the guide key in steps 901 and 902.

In a step 903, it is decided whether results of the inspection by the managerial clerk are approvable or unapproved. When the operator selects an approvable serial number from the regular clerk inquiry screen 64 and inputs the selected serial number by means of the keyboard 33 in a step 911, the terminal control unit 2 synthesizes a guide screen data of the transaction in question and a terminal input data set in the managerial clerk acknowledgement file record 50 and causes the combined data to be displayed on the display 32 of the regular clerk terminal unit 3 in a step 912.

In a step 913, the operator of the regular clerk terminal unit 3 sets the bankbook of the customer held in the bankbook printer 34 and depresses the transmission key. Then, in a step 914, the terminal control unit 2 sends the terminal input data 55 and managerial clerk card data 56 of the managerial clerk acknowledgement file record 50 to the central unit 1. In a step 915, the central unit 1 compares the received terminal input data 55 with the managerial clerk card data 56 and thereafter sends the response message 10 to the terminal control unit 2 which in turn causes the regular clerk terminal unit 3 to print the bankbook, update the magnetic stripes and discharge the bankbook. In a step 916, it is decided whether the message identifier "finished transactions" is designated to the response message 10 received from the central unit 1. If designated, the status indicator 51 of managerial clerk acknowledgement record 50 stored in the terminal control unit 2 is changed to the finished transaction status.

When, in a step 921, the operator of the regular clerk terminal unit 3 selects a transaction rejected by inspection, inputs a serial number of the selected transaction by means of the keyboard, and depresses the transmission key, the terminal control unit 2 synthesizes the guide screen data and the terminal input data set in the managerial clerk acknowledgement file record 50 and sends the combined data to the regular clerk terminal unit 3. When the operator of the regular clerk terminal again depresses the transmission key, the status indicator 51 of the managerial acknowledgement record 50 is rendered a finished transaction status in a step 904.

In this manner, transactions requiring managerial clerk acknowledgement have been completed.

While particular embodiments of the invention have been shown and described, it will be obvious to those skilled in the art that various changes and modifications may be made without departing from the present invention in its broader aspects.

What is claimed is:

1. A method for managerial clerk inspection in an on-line system comprising a plurality of regular clerk terminal units operated for transactions by operators, a terminal unit dedicated to a managerial clerk and operated by said managerial clerk for acknowledgement of transactions, a central unit, and a terminal control unit interposed between said central unit and said regular clerk terminal units and between said central unit and said managerial clerk terminal unit, said method of comprising the steps of:

transmitting a transaction request message from one of said regular clerk terminal units to said central unit via said terminal control unit when an operator operates said regular clerk terminal unit;

determining in said central unit whether a transaction designated by said transaction request message requires acknowledgement by said managerial clerk;

transmitting, when the acknowledgement is required, a message indicative of the required managerial clerk acknowledgement from said central unit to said one of said regular clerk terminal units via said terminal control unit;

displaying on said one of said regular clerk terminal units, an indication of the required managerial clerk acknowledgement;

temporarily releasing said one of said regular clerk terminal units from said transaction;

storing information regarding said transaction into a memory means in said terminal control unit in response to said message indicative of the required managerial clerk acknowledgement from said central unit;

transmitting said message indicative of the required managerial clerk acknowledgement from said terminal control unit to said managerial clerk terminal unit;

displaying on said managerial clerk terminal unit, an indication of occurrence of the transaction requiring the managerial clerk acknowledgement;

transmitting from said terminal control unit to said managerial clerk terminal unit, a message indicative of information regarding the transaction and displaying said requested information on said managerial clerk terminal unit, in response to a request from said managerial clerk terminal unit operated by said managerial clerk;

transmitting information indicative of approval by said managerial clerk from said managerial clerk terminal unit to said terminal control unit in response to said managerial clerk's approval of the transaction;

storing the information indicative of the approval of the transaction into said memory means of said terminal control unit;

transmitting from said terminal control unit to said one of said regular clerk terminal units a message indicative of a finished inspection;

displaying in said one of said regular clerk terminal units an indication of the finished inspection;

transmitting from said terminal control unit to said one of said regular clerk terminal units a message indicative of a contents of the approved transaction, and displaying an indication of the contents in said one of said regular clerk terminal units, in response to a request from said regular clerk terminal units by the operator;

transmitting from said terminal control unit to said central unit a message requesting processing of the approved transaction in response to a request from said one of said regular clerk terminal units by said operator;

transmitting information indicative of rejection by the managerial clerk from said managerial clerk terminal unit to said terminal control unit in response to said managerial clerk's rejection of the transaction at the management clerk terminal;

storing the information indicative of the rejection of the transaction into said memory means in said terminal control unit;

transmitting from said terminal control unit to said one of said regular clerk terminal units said message indicative of the finished inspection;

displaying an indication of the finished inspection on said one of said regular clerk terminal units; and transmitting from said terminal control unit to said one of said regular clerk terminal units a message indicative of a contents of the rejected transaction and displaying the indication of the contents on said one of said regular clerk terminal units in response to a request from said regular clerk terminal unit operated by said operator.

2. A method for managerial clerk inspection according to claim 1, wherein when said managerial clerk terminal unit displays the occurrence of the transaction requiring managerial clerk acknowledgement, in response to an operation of the managerial clerk at said managerial clerk terminal unit for requesting a managerial clerk inquiry screen, status information of each transaction requiring the managerial clerk acknowledgement is transmitted from said terminal control unit to said managerial clerk terminal unit to display on said managerial clerk terminal unit the status information, and in response to operation by the managerial clerk in said managerial clerk terminal unit for dsignating a serial number of a desired one of the displayed transactions, the contents of the desired transaction is transmitted from said terminal control unit to said managerial clerk terminal unit and displayed on said managerial clerk terminal unit.

3. A method for managerial clerk inspection according to claim 1, wherein when said one of said regular clerk terminal units displays the indication of finished inspection, in response to operation of the operator at said one of said regular clerk terminal units for requesting a regular clerk inquiry screen, status information of each transaction requiring managerial clerk acknowledgement is transmitted from said terminal control unit to said one of said regular clerk terminal units to display on said one of said regular clerk terminal units the status information, and in response to operation by the operator at said one of said regular clerk terminal units for designating a serial number of a desired one of the displayed transactions, the contents of the desired transaction is transmitted from said terminal control unit to said one of said regular clerk terminal units and displayed on said one of said regular clerk terminal units.

* * * * *